3,193,498
METHOD OF AND APPARATUS FOR
TREATMENT OF WATER
Roger Platzer, Chatillon-sous-Bagneux, Claude Blain, Paris, Georges Cohen de Lara and Michel Delachanal, Grenoble, France, assignors to Commissariat à l'Energie Atomique (C.E.A.), Paris, France, and Societe Grenobloise d'Etudes et d'Applications Hydrauliques (SOGREAH), Grenoble (Isere), France, a French commission and a French corporation, respectively
Filed Feb. 5, 1962, Ser. No. 170,944
Claims priority, application France, Feb. 8, 1961, 4,333
14 Claims. (Cl. 210—33)

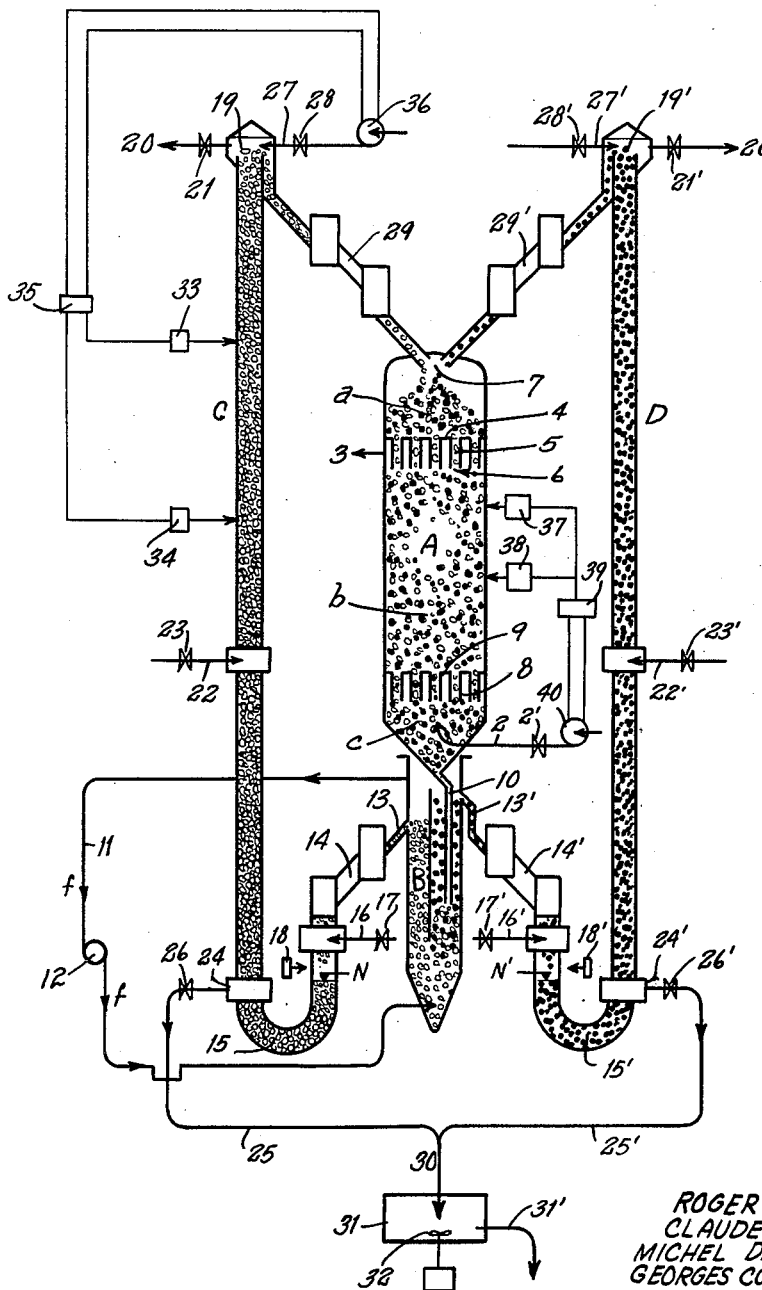

The present invention relates to the treatment of liquids with ion exchange material.

In many industrial fields, it is desired to have available large quantities of either (a) water which does not contain substances in solution (so-called "de-mineralized water," characterized by a very low specific conductivity); or (b) water of well defined quality, for example water containing definitely fixed quantities of certain elements such as fluorine (for prevention of dental decay), or on the contrary, containing only certain elements to the exclusion of others ("soft water," free from calcium, iron, sulphate, etc.), or again water purified to a predetermined pH value. It is known that one method of making any of such types of water available in sufficient quantity is to treat water from an available supply with ion exchange material.

The ion exchange material generally employed for the indicated purpose are of two categories, R'OH⁻ anion exchangers and RH⁺ cation exchange material, in which the OH⁻ and H⁺ ions are replaceable by ions of the same sign, so that when water is passed over a bed constituted of these two categories of ion exchange material, the ions in solution are fixed on the grains, and H⁺ and OH⁻ are liberated, which combine to form a stable compound $H_2O$ to give pure water. The reactions occurring in such treatment are of the following type:

$$R'OH^- + Cl^- \rightleftharpoons R'Cl + OH^-$$
$$RH^+ + Na^+ \rightleftharpoons RNa + H^+$$

The above reactions are reversible, so that the ion exchange material can be regenerated as by treating the anion exchange material with a basic solution and the cation exchange material with an acid solution. The carrying out of this regenerating operation necessitates the previous separation of the two categories of ion exchange material.

The conventional industrial application of the aforesaid type of process is effected by means of installations which work essentially in a discontinuous manner, because they are carried out in a two-stage cycle which comprises a first fixation stage, during which the water is purified, and a second regeneration stage during which the ion exchange material is regenerated. The duration of the cycle is a function of the mineral content of the water (the quantity of ions to be removed) and of the quantity of ion exchange material stored in the exchanger.

To provide a continuous working process of the indicated type, it is necessary to provide two of said installations in parallel, so that one installation performs a fixation operation while the other operates in regeneration. Further, in order to have sufficiently long cycles to assure an adequately high flow-rate, each of such installations should comprise large treatment vessels with a large storage of ion exchange material.

In practicing the aforesaid type of process, it is also necessary to provide a not-negligible personnel for starting up and supervising the regeneration operations during the course of each cycle (3 to 4 hours of labor per cycle, on the average). Finally, since the regeneration operations are carried out discontinuously, by employing a series of other processes in the same column as the treatment operations, it is necessary to inject quantities of reagents greater than those which would normally be necessary, so that the chemical efficiency is poor. For example, it has been found necessary to inject 2.5 to 2.7 times the quantity of regeneration products which are theoretically required, while at the same time obtaining a low percentage of regeneration (from 50 to 70%), with the consumption of rinsing water reaching 10% of the water treated in the installation.

The aforesaid unfavorable factors which are inherent in conventional industrial installations practicing the indicated discontinuous type of process, result in such installations having a low overall efficiency, and consequently a low economic profit margin.

In an effort to avoid the disadvantages of the above discussed type of process, it has been proposed to utilize the principle of moving beds both for the purification of the water and for the regeneration of the anion and cation exchange material, after their separation. However, this method of operation, which is based on the treatment of water in co-current flow relationship with the ion exchange material, has the serious drawback of necessitating an exchanger flow-rate which is a priori very considerably greater than that which is necessary, so as not to risk imperfect purification of the water to be treated. If such risk is assumed, in the event of a certain pollution of the water appearing at the outlet because the exchange material flow-rate is too low, it is obviously possible, for example by measurement of the increase in conductivity, to cause an increase in the exchange material flow-rate so as to return the water to the required degree of purity. However, it is very important to note that since this correction in the flow-rate does not have an immediate effect, a not-negligible quantity of polluted water will flow into the circuit of pure water. Furthermore, such a measurement will not allow the flow-rate of the ion exchange material to also be adjusted to the value required for optimum operation of the apparatus under the new conditions. It will therefore be necessary also to provide continuously a flow of ion exchange material that is very considerably greater than the quantity required for purifying the water. This has the additional consequence during the regeneration, of increasing the quantity of washing water required and therefore the volume of effluents. Finally, it may also be observed that the installation could not in any case be adapted automatically to variations in the composition of the water.

It is the principal purpose of the present invention to provide an improved system for treating water by means of ion exchange material in a highly efficient manner and which will not be subject to the aforementioned disadvantages of known systems of this type.

In accordance with the invention, the water is purified in a mixed bed of anion and cation exchange material by a procedure which is characterized in that, (1) the water purification treatment, (2) the separation of the saturated anion and cation exchange material, (3) the rinsing treatment of the ion exchange material, and, when applicable, (4) the chemical treatment for putting either or both the ion exchange material in an appropriate chemical form, are effected simultaneously and automatically in continuously renewed beds in separate members forming a closed circuit for the ion exchange material, which move successively from one of these members to the other; the water purification, rinsing and chemical treatments, according to the invention, being effected in counter-flow to the solutions.

According to this method of procedure, the demineralization of water is for example effected in the following manner:

The water is treated in counter-flow in a first section of the installation by means of a continuously renewed compact bed constituted of a mixture of anion and cation exchange material, the ions in solution in the water being fixed by the ion exchange material during the course of their passage through this first section, and the uniform forward movement of the bed of exchange material being obtained by a suitable modulation of the injected rates of flow.

The anion and cation exchange material thus saturated are continuously separated in a second section.

The saturated and separated ion exchange material is regenerated separately in counter-flow in a continuously renewed bed in two further sections and are finally re-introduced in a homogeneous mixture, after rinsing, into the first treatment section.

As the method of the invention treats the water in counter-flow, it is possible to provide a saturation front of the ion exchange material in the purification column. The position of the saturation front can readily be determined accurately by measuring the quality of the water inside the treatment bed, for example by resistivity measurements. Such measurements can be utilized also to localize the position of the front, the shape of which is quite characteristic in moving mixed beds, and to guide, when this is necessary, such slight modification of the ratio of the ion exchange material flow and the flow of water to be treated, as to maintain the front in a previously determined position. Thus, for example, it is useful to provide two resistivity measurement probes located for example at 10 cm. above and 10 cm. below the mid point of the treatment bed.

With two probes of the indicated type located so that one of such probes is positioned on one side of the front in the zone of the saturated resins and therefore in the presence of water having low resistivity, and the second probe positioned on the other side of the front, in the zone of introduction of the regenerated resins, in purified water which thus has a very high resistivity, the working of the apparatus of the invention may be regulated in such manner that the front will be kept between these two probes. In the operation of such apparatus, let it be assumed, for example, that due to a slight maladjustment of the apparatus, a modification of the composition of the water to be treated causes a reduction in resistivity on the probe normally placed in the saturated zone. This will indicate that the saturated front has been displaced in the column, and an order can then be given to increase very slightly the flow of ion exchange material so that the saturation front is restored to its initial position, with the probe again in a zone or pure water. Similarly, if the resistivity has a tendency to increase on the other probe, an order will be given to reduce the flow of ion exchange material; thereby causing the return of the front to its initial position.

It will be noted that in the exercise of the above indicated control, the variations of flow thus controlled are very small; thereby enabling the construction of an apparatus having an operation which is continuously adapted to the requirements for correct working thereof. It will be further noted that as a result of this method, there is no risk of introducing insufficiently purified water into the utilization circuit, thus assuring absolute safety of operation of the apparatus as a producer of purified water. Consequently, the best possible economy of utilization of the ion exchange material is accomplished.

In accordance with a preferred form of the invention, apparatus constructed, for example, to carry out the demineralization of water, will comprise a water-treatment chamber in which an intimate mixture of the anion and cation exchange material is in a compact downwardly moving bed. The circulation of the water to be treated is passed through the bed in counter-flow with respect to the ion exchange material, the water being introduced at the lower extremity of the chamber, and flowing up through the bed, with the purified water evacuated at the upper extremity of the chamber. The anion and cation exchange material are introduced into the upper extremity of the chamber, and the saturated exchange material is discharged at the lower extremity thereof into a liquid fluidization separator, composed of two compartments, in which is effected the separation of the anion and cation exchange material. The exchangers which are collected in each of the said compartments, pass outwardly therefrom by overflow, and are then introduced by means of suitable sealing devices, into a separate regeneration column. The ion exchange material introduced into each regeneration column is fed into the bottom of the regeneration column and moves upwardly therein towards the top thereof. The regeneration liquid is introduced at an intermediate point of the column and flows toward the base of the column. A rinsing liquid is introduced into the top of the column and also flows towards the base of the column. The moving bed of ion exchange material thus passes through the column in counter-flow with respect to the regeneration products and the rinsing liquid. The regenerated ion exchange material is re-introduced with the aid of suitable sealing devices into the top of a separate column provided with the said water treatment chamber.

An installation such as aforesaid offers certain advantages over known conventional installations. As a result of its continuous operation, only a single apparatus is required for producing a continuous flow of purified water. Further, the quantity of ion exchange material necessary for working of the apparatus is very small, as compared with that of conventional installations, since the saturated ion exchange material is continually being replaced by an equivalent quantity of regenerated ion exchange material, and consequently there is no need to have a large reserve of capacity of useful stock (stock of ion exchange material).

In addition, the dimensions of the treatment chamber in such an installation are defined, in height, by the length of the saturation front which, in the case of mixed beds of cation exchange material, is considerably less than one meter, and, in diameter, by the admissible specific flow-rate which, in the case of mixed beds, is 500 to 1500 liters per hour per sq. dm., whereas it is only 200 liters per hour per sq. dm. approximately in separate beds. It is therefore possible in such an installation to reduce the diameter of the treatment column and in consequence the minimum volume of the stock of ion exchange material needed for its operation substantially below that required by known conventional exchangers having separate beds.

It will be further noted that in an apparatus of the type indicated embodying the invention, the high-efficiency regeneration of a mixed bed of cation and anion exchange material does not present any difficulties and enables the elimination of the need for separate beds of anion and cation exchange material. Customarily, such separate beds are arranged on the upstream side of conventional mixed beds with the object of considerably increasing the duration of the cycle of use of these latter, which are in this case considered as purification finishers. As a consequence of the arrangement of this invention there is attained a considerable reduction in the total stock of ion exchange material needed to be purchased, and of the size of the installation, both as regards equipment and surface area on the ground. These advantages become increasingly important as the hourly flow-rate of the installation increases.

It will also be noted that in the above indicated installation embodying the invention, there is no need for supplementary labor to carry out the operations of separation and regeneration of the ion exchange material, due to the fact that these operations are carried out simultaneously with the purification treatment of the water as the installation automatically operates in a continuous fashion.

Finally, in such installation it has been found that the consumption of regeneration and rinsing reagents is definitely lower than that of known conventional installations, while at the same time higher rates of regeneration are obtained, since, on the one hand, the ion exchange material is transferred for regeneration into columns the diameter of which is adapted to the flow-rate of the reagents, and not, as in conventional installations, to the flow of water to be purified (this permits an excellent distribution of the reagent throughout the entire bed, without any preferential path), while, on the other hand, it is possible to obtain a continuous working state such that the regeneration front and the washing front are fixed with respect to the column because the regeneration and rinsing are carried out in counter-flow in a moving bed. It is well known that the maintenance of a continuous state of working enables the most economic conditions possible to be obtained.

The continuous and stable distribution of the concentrations enables the regeneration reagent to be introduced in much higher concentrations than is permitted in conventional installations, without causing any deterioration of the ion exchange material by abrupt variation in concentration. Thus, there can be obtained much higher regeneration rates without increasing the consumption of reagent. The advantages of such a high rate of regeneration are a better use of the capacity of the ion exchange material (reduction of the stock required), and the possibility of fixing very slightly ionised anions and cations; the latter of which results in a correspondingly higher degree of purification.

In the said installation also, reagents coming from the rinsing stage are effectively utilized for regeneration, which is not generally the case in conventional installations.

It is believed that it will be apparent from the foregoing that the quantity of water that will be necessary for rinsing in the said installation is considerably below that employed for such operation in conventional installations. It has been found that a few parts per thousand are adequate for such installation, whereas in the known conventional installations, this consumption varies from 3 to 10%, depending on the type of installation. This reduction of water consumption has the advantage, in addition to its obvious economic advantage, of reducing the volume of effluents, and in consequence the cost of their treatment so as to permit of their being passed to waste under legal conditions. It may be observed moreover that these effluents are practically neutral, since the effluents of the two regeneration columns can be employed to neutralize themselves continuously at the outlet of the apparatus.

A a result of having the adjustment of the flow rate of the ion exchange material in the column for purifying the water controlled as above stated, the ion exchange material discharging from the column is completely saturated. Accordingly, the quantity of reagent which it is necessary to employ in the installation is exactly known. The employment of this quantity of reagent may be automatically adjusted to suit conditions, for example, by making the flow rate of reagents of constant concentration dependent upon the flow rate of the ion exchange material. This latter flow rate can be ascertained readily, for instance, by measurement of the number of the impulsions by time unity for the progression of the ion exchange material in the regeneration columns. By having the quantity of the regeneration reagents always equal to the consumption, there is no risk of disadjustment of the regeneration columns, and the reagent consumption is as economical as possible. There is however, the possibility that a slight transitory disadjustment may occur between the flow rate of the ion exchange material and the flow rate of the treatment solution (regeneration reagent and rinsing water). Such a disadjustment can result in a change in the positions of the regeneration front and of the rinsing front in the column. This possibility can be eliminated by making the position of the fronts dependent on the rinsing flow rate and by utilizing the latter, as a control since its value is not critical because no consumption of reagent is involved.

The features and advantages of the invention will become clearer from a perusal of the following description which describes, by way of example, an installation for demineralizing water in a mixed bed of anion and cation exchange material, and in which description reference is made to the accompanying drawing which shows a diagrammatic view of the described installation in vertical section.

The installation comprises essentially a treatment chamber A, a fluidization separating column B, and two regeneration and rinsing columns C and D.

The treatment chamber A is divided into three parts. In the top part $a$ of the chamber is a reserve in the form of a mixed bed of regenerated anion and cation exchange material, and in the center is located the treatment chamber proper $b$. The bottom of the chamber is utilized as a storage chamber $c$ for the saturated ion exchange material. Between chamber parts $a$ and $b$ is mounted a perforated plate 4 provided with a plurality of tubes 5 of appropriate length and diameter and provided with grids 6 in the spaces between the tubes. The construction of plate 4 is such that it permits the flow of exchange material from the reserve $a$ down into the treatment chamber proper $b$ and enables the water treated in the latter to be delivered to a discharge pipe 3. A similarly constructed perforated plate 9 provided with tubes 8 is located between the treatment chamber parts $b$ and $c$ and permits downward flow of the saturated exchange material from the former chamber part $b$ to the latter chamber part $c$ and the upward flow of the water to be treated from chamber part $c$ to chamber part $b$.

The water to be treated is introduced periodically into the base part $c$ of the treatment chamber by a delivery pipe 2 and its flow into such part is controlled by a valve 2' provided on such pipe 2. Following its entry into the chamber part $b$, the water to be treated passes up through the tubes 8 of plate 9 and into chamber part $b$. This flow of the untreated water through the tubes 8 prevents downward movement of the ion exchange material from chamber part $b$ into chamber part $c$. At the same time, the tubes 5 of the top plate 4 prevent such ion exchange material in chamber part $b$ from rising into the top chamber part $a$, due to a reaction on the walls of these tubes by the hydro-dynamic forces developed in the bed of chamber part $b$. When the flow-rate of the untreated water into chamber part $c$ is suitably modulated, the ion exchange material will be enabled to move downwards into such chamber part from chamber part $b$. The ion exchange material passing from chamber part $b$ to part $c$ thereof are replaced at all points of the treatment chamber proper $b$ by regenerated ion exchange material coming from the top chamber part $a$. Thus, as the cycle of water treatment is repeated, the mixed bed of ion exchange material in chamber part $b$ is being periodically partially renewed by the evacuation, through the tubes 8 in bottom plate 9, of the saturated ion exchange material into the bottom chamber part $c$, and by the introduction through the tubes 5 of the top plate 4 of the regenerated ion exchange material from the top chamber part $a$. From chamber part $c$, the saturated ion exchange material is uniformly distributed to the separator B.

The untreated water passing through the tubes 8 of plate 9, flows upwardly through the mixed bed of regenerated anion and cation exchange material in the chamber proper $b$ and toward the top of such chamber part. As has already been indicated, this upward flow of the untreated water at the same time brings to a stop the downward movement of the saturated exchange material through the bottom plate 9. The high value of the flow rate of the water into the chamber also causes a maximum packing of the ion exchange material bed in chamber part b thus placing such mixed bed in the best condition for the fixation of ions. The duration of the treatment of the water in the chamber proper b may be one or several minutes, the treated water arriving at the top of such chamber passing out through the pipe 3. The flow of the purified water from pipe 3 is regularized by a known device provided with a hydraulic fluid pressure accumulator.

As has also been previously indicated, such period of treatment of the water is followed by a period of short duration in which the ion exchange material bed in chamber part b moves toward the bottom chamber part c. This movement of the ion exchange material bed constitutes the transport phase of the treatment and is brought about by modulating the injection of the untreated water into chamber part c.

The saturated ion exchange material collected at the bottom part c of the treatment chamber pass regularly therefrom through a tube 10 into the liquid fluidization separator B, in which separation of the anion and cation exchange material is effected continuously and in a self regulated manner. The separator B forms part of a closed circuit 11 through which water is circulated in the direction of the arrows f by means of a pump 12.

The separated cation exchange material is recovered at the outlet 13 of the separator and pass into an appropriate lock chamber device 14 which drops the cation exchange material into one end of an elbow 15 which is in communication at its other end with the base 24 of the regeneration column C. A transport liquid is injected at 16 into the entry end of the elbow 15 for carrying the cation exchange material through such elbow and into and up to the top 19 of the regeneration column C, the transport liquid being evacuated from the top A of column C through a pipe 20. The flow of the transport liquid into the entry end of the elbow 15 is regulated by a valve 17 and suitable level detector control means 18, N of known construction. A valve 21 is also provided in the transport liquid discharge pipe 20 to control the flow of such liquid therethrough.

As has been indicated, the cation exchange material is carried toward the top 19 of the column C as its regeneration and rinsing are carried out in counterflow. The regeneration acid is injected into the column C at a place 22 intermediate the height of such column from a valve controlled conduit 23, and is evacuated at the base 24 of such column into a conduit 25 controlled by a valve 26. The rinsing water is injected into the top 19 of the column C from a pipe 27 controlled by a valve 28 and is evacuated with the regenerating solution at the base 24 of the column C. The rinsing and regenerating solution are thus both removed from column C through the conduit 25.

The regeneration of the anion exchange material is carried out in identically the same manner in the column D, except that instead of a regenerating acid, a basic regenerating solution is injected at the comparable intermediate place 22' of column D. Thus, the separated anion exchange material that is recovered at the outlet 13' of the separator B, passes through a lock chamber device 14' and elbow 15' into the bottom end 24' of column D, being carried through such elbow and column by a transport liquid which is injected into the system at 16' and removed from the top 19' of column D through a pipe 20'. The rinsing fluid is injected into the top of column D from a conduit 27' and both such fluid and the basic regenerating solution are removed at the base of column D through the conduit 25'.

The two liquid effluents coming from the regeneration columns C and D through the conduits 25 and 25', respectively, are joined together in a common outlet 30 which discharges into a chamber 31 provided with a suitable mixing device 32. The neutralization of the two effluents is thus effected by intermixing one with the other. The mixture of effluents is removed from the chamber 31 through a suitable conduit 31'.

The regenerated and rinsed cation and anion exchange material pass from the upper ends 19, 19' of the columns C, D, respectively, through associated lock chambers 29, 29', respectively, and regularly and in small quantities from the latter into the top part a of the treatment chamber A. The regenerated anion and cation exchange material are so introduced into the chamber part a that they are joined and become mixed together at the place 7 in the upper portion of the chamber part a to form a homogeneous mixture for renewing of the reserve bed in such chamber part.

It will be understood from the foregoing, that from the reserve or reservoir chamber part a the regenerated and rinsed, homogeneously mixed, anion and cation exchange material will flow periodically into the treatment chamber proper b, to be evacuated when saturated as the result of the counterflow of water being treated, through the tubes 8 of the pierced plate 9 into the bottom part c of the treatment chamber. This operation of the treatment chamber portion of the installation, as has been indicated, is characterized by the repeated alternation of two working phases, namely, a treatment phase in which the water is being treated while the downward movement of the exchange material is temporarily halted, and a transport phase in which the exchange material renews its downward movement to effect a partial renewal of the ion exchange material bed in the treatment chamber part b.

The treatment chamber A is provided with means for controlling the position of the treatment front. Such means comprises two resistivity cells 37 and 38 located on the chamber A to measure the resistivity of the water on both sides of the treatment front. The cells 37, 38 are electrically connected to a conventional type of responsive device 39 capable of controlling the operation of the electric motor of pump 40 connected to the untreated water supply line 2. With this arrangement, when the treatment front changes from a given normal position, such change will be detected by the cells 37 and 38 which will actuate the responsive device to cause the velocity of the motor and therefore that of the pump to be modified so as to change the flow rate of the water to be treated to the degree necessary to bring the treatment front back to its normal position. Thus should the treatment front move from is normal position in a downward direction, the velocity of the pump will be increased to increase the supply of water being pumped in through the line 2, while when the treatment front moves upwardly from its normal position, the operation of the pump will be slowed to decrease the flow of untreated water being pumped into the bottom part c of the treatment chamber.

Each of the columns C, D is also provided with means for controlling the position of the rinsing front in such column. As the means associated with each of columns C and D for this purpose are exactly alike, in order to simplify the showing of the drawing, they have been shown therein only in connection with column C, it being understood however, that column D is also provided with like means associated therewith in the same manner. It will be noted that such means are essentially the same as the means associated with the treatment chamber A for controlling the treatment front therein, in that they include two resistivity cells 33, 34 located on opposite sides of the rinsing front in its normal position in column C, and a responsive device 35 electrically connected to control the electric motor of the pump 36 for feeding rinsing water through the supply pipe 27. It will therefore be readily understood that when the rinsing front moves vertically from its given position in the conduit C, this change will be detected by the cells 33 and 34 and they will actuate the responsive device 35 to cause a change in the velocity of the pump and consequently in the flow rate of the rinsing water such as will restore the rinsing front to its normal position. The flow rate of the rinsing water will be increased to move the displaced front downwardly to its normal position, and will be decreased to enable the displaced front to move upwardly to its normal position.

As has been previously stated, the form of construction illustrated in the drawings and hereinabove described, has been given by way of example and should not be considered as restrictive; it being the intention of applicants to cover all forms of the invention coming within the scope of the appended claims.

We claim:

1. The method of treating liquids with anion and cation exchange material which comprises moving the anion and cation exchange material in two endless closed circuits each composed of a vertical regeneration column from the upper end of which the regenerated ion exchange material is fed to a supply pile at the upper end of a vertical column common to both circuits and including a mixed bed of anion and cation exchange material that is situated below said supply pile and is continuously renewed from said supply pile, the saturated anion and cation exchange material passing from the bottom of said mixed bed being separated and fed into the bottom ends of the regeneration columns in their associated endless closed circuits, introducing rinsing liquid into the upper end of the regeneration column in each circuit to enable such liquid to flow downwardly in counterflow relation to the upwardly moving ion exchange material therein, introducing regeneration liquid into the regeneration column in each circuit at a point below the upper end thereof to enable such liquid to flow downwardly in counterflow relation to the upwardly moving ion exchange material therein, introducing the liquid to be treated into the bottom end of said common column below said mixed bed and forcing such liquid up through the latter in counterflow relation to the downwardly moving ion exchange material in said bed, and withdrawing the treated liquid rising through such mixed bed at the top of the latter and below said supply pile of regenerated exchange material.

2. A method such as defined in claim 1, in which the regeneration and rinsing liquids introduced into each regeneration column are removed together at a place located at the lower ends of said columns, the combined regeneration and rinsing liquids recovered from both of said regeneration columns being thereafter intermixed to provide a substantially neutral mixture of the same.

3. A method such as defined in claim 1, in which each separated, saturated exchange material is fed with a transport liquid into the bottom end of its associated regeneration column, and including selecting the flow rates of the transport, regeneration and rinsing liquids for at least one of said ion exchange materials to maintain the rinsing front therefor at a given portion of the regeneration column for such one material, located intermediate said points of application of the regeneration and rinsing liquids, and varying at least one of such flow rates, in the event of a movement of such front out of such given portion, such as to bring such front back into such given portion.

4. A method such as defined in claim 3, in which the flow rate of said rinsing liquid is modified in the event of a movement of the rinsing front from said given portion of the regeneration column.

5. Apparatus for the treatment of liquids with ion exchange material, comprising an elongaed, vertically disposed treatment tank having an upper portion, an intermediate portion and a lower portion, and having a top inlet for the introduction of regenerated ion exchange material into said upper tank portion, and having a bottom outlet for the discharge of saturated ion exchange material from said lower tank portion, means in the upper portion of said tank defining with the latter an upper reserve chamber portion of the tank, means in the lower portion of said tank defining with the latter a bottom storage chamber portion of the tank, said upper and lower means and the intermediate portion of said tank defining an intermediate liquid treating chamber portion containing throughout its extent a deep bed of mixed anion and cation exchange material, means for continuously feeding regenerated anion and cation exchange material to said upper tank portion and into a supply pile on said upper means, said upper and lower means being constructed to enable said deep bed to be renewed, by the passage through the former of regenerated ion exchange material drawn from the bottom of such pile thereof into said bed, and by the passage of saturated ion exchange material from said bed through said lower means and into said bottom storage portion as the same are withdrawn from the latter through said bottom outlet, and means for controlling the rate of downward flow of the ion exchange material through said deep bed comprising means for injecting the liquid to be treated into said bottom storage portion at a place spaced upwardly from said bottom outlet and under such pressure that the liquid is caused to flow upwardly through said lower means and through said deep bed in counterflow relation to the downwardly moving ion exchange material therein, and means for withdrawing the treated liquid in the region of said upper means and at the juncture of said deep bed and said supply pile.

6. Apparatus for the treatment of liquids such as defined in claim 5, in which said controlling means includes means for varying the applied rate of flow of the liquid to be treated into said bottom storage portion to effect in alternate repeated fashion a treating interval for said liquid in said bed and a transport interval for said ion exchange material through said bed, said varying means modifying such liquid so that the renewal rate of said ion exchange material in said intermediate bed portion is substantially reduced in said treating interval.

7. Apparatus for the treatment of liquids such as defined in claim 5, including means located adjacently below the bottom outlet end of said treatment tank for continually separating the saturated anion and cation exchange material removed from the bed by said withdrawing means.

8. Apparatus for the treatment of liquids such as defined in claim 7, including means for supporting two columns of continually renewing separate beds of said separated anion and cation exchange material, means for feeding the separated ion exchange material in separated condition from said separating means to the lower ends of such columnar beds in said separate supporting means and upwardly through such beds, and means for continually feeding regenerating and rinsing liquids to each of said separate beds in counter-flow to the direction of renewal thereof, and means for removing the regenerated ion exchange material from the upper ends of said supporting means.

9. Apparatus for the treatment of liquids such as defined in claim 8 in which there is associated with each of said supporting means for the separate columnar beds of upwardly moving anion and cation exchange material, a first means for continually injecting a regeneration liquid into the bed supported thereby at a first point located intermediate the upper and lower ends of such bed, a second means located at a point above said first point for continually injecting a rinsing liquid into the bed, and a third means located below said first point for continually removing the effluent of said regeneration and rinsing liquids.

10. Apparatus for the treatment of liquids such as defined in claim 9, including means for continually combining and mixing the effluents from both of said supporting means for the separate columnar beds of anion and cation exchange material.

11. Apparatus for the treatment of liquids such as defined in claim 8, in which said means for feeding the separated ion exchange material includes means for mixing a transport liquid with each separated ion exchange material prior to its entry into the lower end of its associated columnar supporting means, and including means at the upper ion exchanger discharge end of each of said columnar supporting means, for continually separating the regenerated ion exchange material from such transport liquid, said removing means being operable to feed the separated regenerated anion and cation exchange material to the top inlet of said treatment tank and to mix said regenerated ion exchange material in said reserve portion of said tank and deposit the resulting mixture thereof into the supply pile on said upper means.

12. Apparatus for the treatment of liquids such as defined in claim 5 including means for detecting a change in position of the treatment front in the intermediate liquid treating portion of said tank from a given operating position therefor located between said upper and lower means, said controlling means including means for varying the fluid flow of the liquid to be treated into said bottom portion of the bed, and means responsive to said detecting means and controlling said fluid flow varying means, and operable to cause the latter to modify the injection flow of the liquid to be treated so as to maintain such treatment front in its given operating position.

13. Apparatus for the treatment of liquids such as defined in claim 8, in which said means for feeding rinsing liquid to said beds in said columnar supporting means are located at the upper end portions of the latter, and including means for detecting a change in position of the rinsing front formed by the downwardly flowing rinsing fluid in the bed supported in at least one of said columnar supporting means from a given operating position thereof located below the associated rinsing liquid feeding means, means for controlling the fluid flow of at least one of the liquids being fed to such bed, and means responsive to said detecting means and controlling said fluid flow control means, and operable to cause the latter to modify the flow of said controlled liquid so as to maintain said rinsing front in its given operating position.

14. Apparatus for the treatment of liquids with ion exchange material, constituted of a plurality of elements arranged to form two endless, closed circuits for the materials utilized in such treatment, and including a vertically disposed treatment tank common to both circuits and having a top inlet for the introduction of regenerated ion exchange material and a bottom outlet for the discharge of saturated ion exchange material, and an ion exchange material separating means common to both circuits and connected to the bottom outlet of said treatment tank, and said elements including in each closed circuit means for supporting an upstanding column of separated ion exchange material, means for feeding such ion exchange material from said separating means to the lower end of such columnar supporting means, and means for feeding such ion exchange material from the upper end of such columnar supporting means to a supply pile of mixed ion exchange material in the upper end portion of said treatment tank, said apparatus further comprising means at the upper end portion of each columnar supporting means for introducing rinsing liquid to the exchanger column therein to flow downwardly in counterflow relation to the upwardly moving ion exchange material in such column, means located below said rinsing liquid means for introducing regeneration liquid to the exchanger column in such supporting means to flow downwardly in counterflow relation to the upwardly moving ion exchange material in each column, and means at the lower end portion of such supporting means for recovering the regeneration and rinsing liquids, means in the upper portion of said treatment tank forming an upper reserve chamber portion for said supply pile of mixed regenerated ion exchange material, means in the lower portion of said tank forming a bottom storage chamber portion for the saturated ion exchange material, said upper and lower means defining the ends of a treating chamber portion containing throughout its extent a deep bed of mixed anion and cation exchange material, and said upper and lower means being constructed to enable said deep bed to be renewed, by the passage through the former of regenerated ion exchange material drawn from the bottom of such pile thereof into said bed, and by the passage of saturated ion exchange material from said bed through said lower means and into said bottom storage portion as the same are withdrawn from the latter through said bottom outlet, and means for controlling the rate of downward flow of the ion exchange material through said deep bed comprising means for injecting the liquid to be treated into said bottom storage portion at a place spaced upwardly from said bottom outlet and under such pressure that the liquid is caused to flow upwardly through said lower means and through said deep bed in counter flow relation to the downwardly moving ion exchange material therein, and means for withdrawing the treated liquid in the region of said upper means and at the juncture of said deep bed and said supply pile.

References Cited by the Examiner
UNITED STATES PATENTS

| | | | |
|---|---|---|---|
| 2,572,848 | 10/51 | Fitch | 210—189 |
| 2,767,140 | 10/56 | Fitch | 210—33 |
| 2,973,319 | 2/61 | Porter | 210—33 |
| 3,072,567 | 1/63 | Evans et al. | 127—46 |

MORRIS O. WOLK, *Primary Examiner.*

ALEXANDER WYMAN, *Examiner.*

UNITED STATES PATENT OFFICE
CERTIFICATE OF CORRECTION

Patent No. 3,193,498 July 6, 1965

Roger Platzer et al.

It is hereby certified that error appears in the above numbered patent requiring correction and that the said Letters Patent should read as corrected below.

Column 4, line 9, for "exchangers" read -- exchange material --; column 9, line 70, for "elongaed" read -- elongated --; column 10, line 38, after "liquid" insert -- flow --.

Signed and sealed this 22nd day of February 1966.

(SEAL)
Attest:

ERNEST W. SWIDER
Attesting Officer

EDWARD J. BRENNER
Commissioner of Patents